US007100117B1

(12) United States Patent
Chwa et al.

(10) Patent No.: US 7,100,117 B1
(45) Date of Patent: Aug. 29, 2006

(54) DATA INFORMATION DISPLAY METHOD OF DATA BROADCASTING RECEIVER AND APPARATUS THEREOF

(75) Inventors: Duk Chin Chwa, Seoul (KR); Jae Rock Kwon, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 511 days.

(21) Appl. No.: 09/709,554

(22) Filed: Nov. 13, 2000

(30) Foreign Application Priority Data

Nov. 12, 1999 (KR) ................................ 1999-50281

(51) Int. Cl.
*G06F 17/00* (2006.01)

(52) U.S. Cl. ...................... 715/763; 715/769; 715/700; 715/749; 715/744; 715/768

(58) Field of Classification Search ................ 345/769, 345/700, 749, 763, 744, 768
See application file for complete search history.

(56) References Cited

U.S. PATENT DOCUMENTS

| 5,933,141 A | * | 8/1999 | Smith .......................... 725/39 |
| 5,956,030 A | * | 9/1999 | Conrad et al. ............... 345/769 |
| 6,025,837 A | * | 2/2000 | Matthews et al. ........... 345/721 |
| 6,188,401 B1 | * | 2/2001 | Peyer ........................... 345/805 |
| 6,295,559 B1 | * | 9/2001 | Emens et al. ................ 709/225 |
| 6,560,616 B1 | * | 5/2003 | Garber ......................... 707/203 |
| 6,788,347 B1 | * | 9/2004 | Kim et al. .................... 348/441 |

| 2002/0091688 A1 | * | 7/2002 | Decary et al. ................. 707/6 |

FOREIGN PATENT DOCUMENTS

WO   W)97/12342   *   4/1997

* cited by examiner

*Primary Examiner*—Kristine Kincaid
*Assistant Examiner*—Peng Ke
(74) *Attorney, Agent, or Firm*—Birch, Stewart, Kolasch & Birch, LLP (57) ABSTRACT

The present invention relates to a data information display method of a data broadcasting receiver and an apparatus thereof, in particular to a data information display method of a data broadcasting receiver and an apparatus thereof which is capable of selecting a simple data information picture or a data information picture or a general television picture according to a viewer select in a digital data broadcasting, and knowing overall content of the present receiving data information without switching the present audition television picture into the data information picture when the viewer selects the simple data information picture. The present invention comprises a parsing unit for analyzing the data information, a summary information extracting unit as an additional module of the parsing unit for detecting the abridged data content of the data information, a formatting unit for formatting the data information outputted from the parsing unit in order to display it, a displaying unit for displaying and transmitting the data information formatted on the formatting unit to a screen, and a user interface for transmitting and receiving signals with the parsing unit according to the input of the viewer. Accordingly, the viewer can watch the television picture faithfully and at the same time can use the data appropriately also.

7 Claims, 6 Drawing Sheets

INFORMATION
WINDOW

INFORMATION WINDOW

FIG. 6B

DATA INFORMATION DISPLAY METHOD OF DATA BROADCASTING RECEIVER AND APPARATUS THEREOF

BACKGROUND OF THE INVENTION

1. Field of the Invention

The present invention relates to a data information display method of a data broadcasting receiver and an apparatus thereof, and in particular to a data information display method of a data broadcasting receiver and an apparatus thereof which are capable of displaying data information corresponding to the present audition television picture as a simple data information picture without changing the size of the present audition television picture.

2. Description of the Prior Art

Generally, in a digital data broadcasting, additional data information is transmitted from a transmitter to a receiver with an A/V (Audio/Visual) stream for a television by using digital signals.

In the digital data broadcasting, the transmitter compacts separately the video and audio, encodes it, multiplexes it, and transmits the data stream to the receiver. Then the receiver receives the data stream, corrects all errors, decodes it, and demultiplexes it into the original video and audio.

In order to watch the digital data broadcasting, an additional data processing S/W program for a digital broadcasting (hereinafter, it is referred to as a data browser) is required for the receiver in order to process the A/V stream and data and to support collectively various kinds of user support services, and the format and function of the data browser is similar to the format and function of an internet web browser.

The internet web browser is a S/W program based on the internet. It comprises a plurality of internet protocols, a HTML (Hyper Text Markup Language) document, a CSS (Cascading Style Sheets) Paser, a Java Script, a JAVA related engine, a formatting function for display, and its own program, and it supports most of e-mail protocols.

In addition, basic functions of the data browser used for the data information display apparatus of the data broadcasting receiver will now be described.

The data browser judges whether or not data is received related to the present audition broadcasting, detects the data when the data is received, informs the data receipt to a viewer by displaying an icon on a screen, and prepares a parsing, formatting, displaying of the received data information.

After that, when the viewer wants to watch the data information receiving at the present and selects a "television and data broadcasting simulcast audition" item by using a remote-controller or an external input device, the data information picture is displayed. When the viewer does not watch the receiving data information, the present audition general television picture is displayed.

Figure 1:
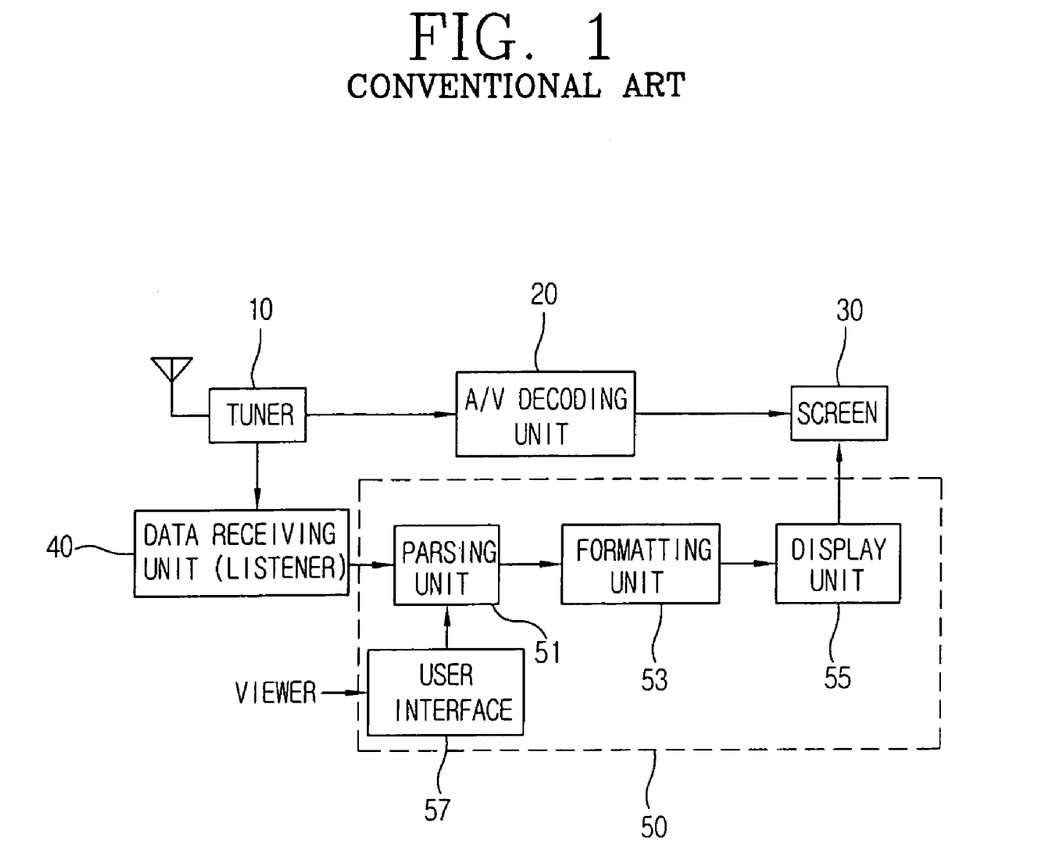
FIG. 1 is a block diagram illustrating the general data information display apparatus of a data broadcasting receiver.

FIG. 1 is a block diagram illustrating the conventional data information display apparatus of the data broadcasting receiver. It comprises a tuner 10 for tuning signals received through an antenna, an A/V decoder unit 20 for converting the signal tuned on the tuner 10 into an A/V stream, a screen 30 for displaying the A/V stream outputted from the A/V decoder unit 20, a data receiving unit 40 (listener) for searching whether there is the data information among the signals tuned on the tuner 10, and a PE (Presentation Engine) unit 50 for parsing and formatting the data information detected by the data receiving unit 40 and outputting the data information having the displayable format to the screen 30.

Herein, the PE unit 50 comprises a user interface 57 for receiving an input signal of the viewer, a parsing unit 51 for receiving the user input signal though the user interface 57 and parsing the data information outputted from the data receiving unit 40, a formatting unit 53 for formatting the data information outputted from the parsing unit 51 in order to display, and a display unit 55 for processing the data information formatted on the formatting unit 53 so as to have the displayable format and transmitting it to the screen 30.

Herein, the parsing unit 51 parses the data information outputted from the data receiving unit 40 by using the HTML (Hyper Text Markup Language) document, CSS (Cascading Style Sheet) Paser, Java Script, etc.

The operation of the data information display apparatus of the general data broadcasting receiver having the above-mentioned construction will now be described.

First, the signal received through the antenna is tuned on the tuner 10, the tuned A/V signal is outputted to the A/V decoder unit 20, and the A/V decoder unit 20 converts the tuned signal into the A/V stream. The A/V stream is displayed on the screen 30.

Meanwhile, the data receiving unit 40 detects whether there is data information among the signals tuned on the tuner 10, and stores it when the data information is detected. After that, when the viewer requests the data information output through the user interface 57 while the data receiving unit 40 receives the data information, the parsing unit 51 detects and parses the data information stored on the data receiving unit 40, and outputs the parsed data information. And, the formatting unit 53 formats the data information outputted from the parsing unit 51, and then the display unit 55 receives the data information formatted on the formatting unit 53, processes the formatted data so as to have the displayable format, and transmits it to the screen 30.

Figure 2:
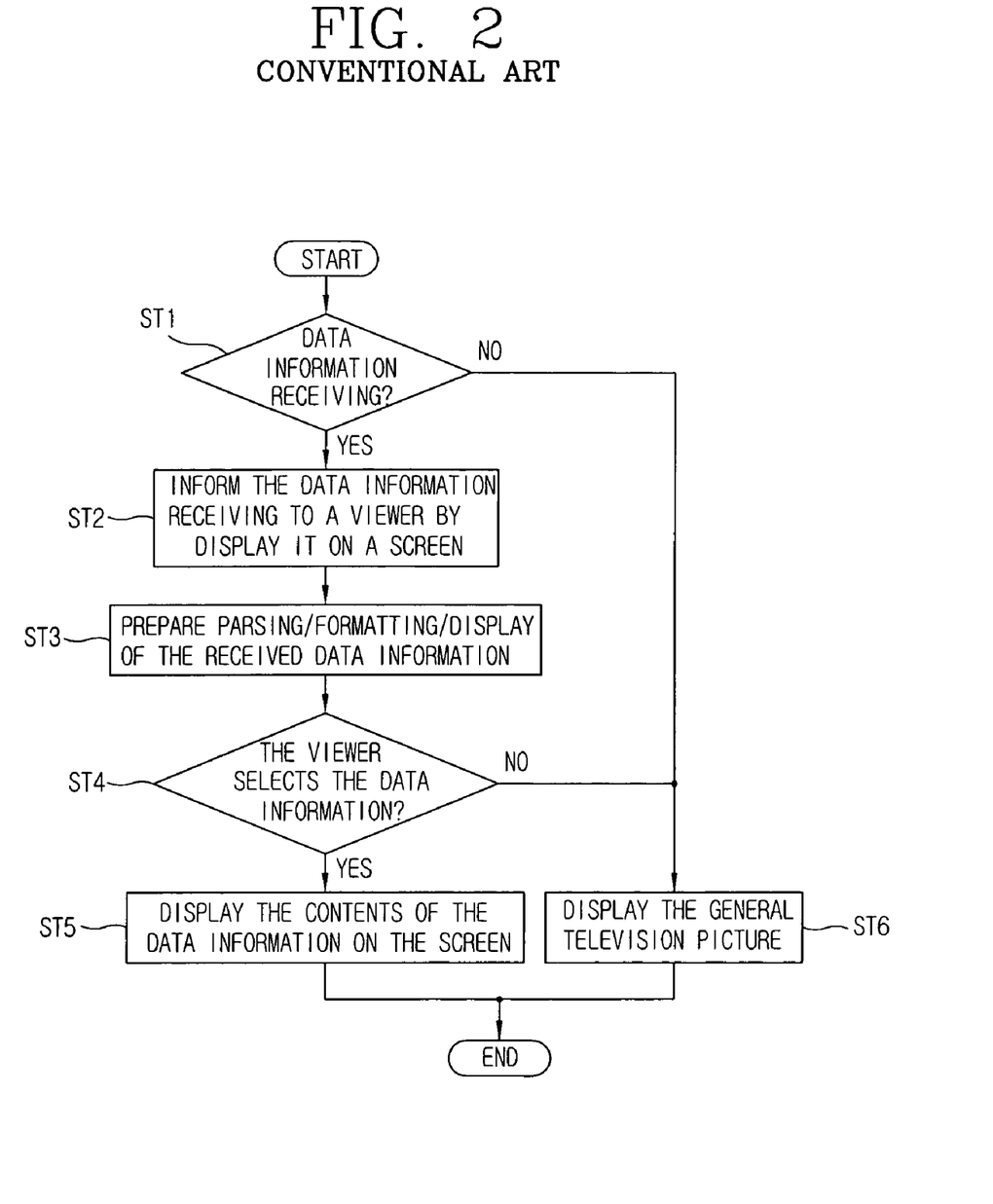
FIG. 2 is a flow chart illustrating the general data information display method of the data broadcasting receiver.
Figure 3A:
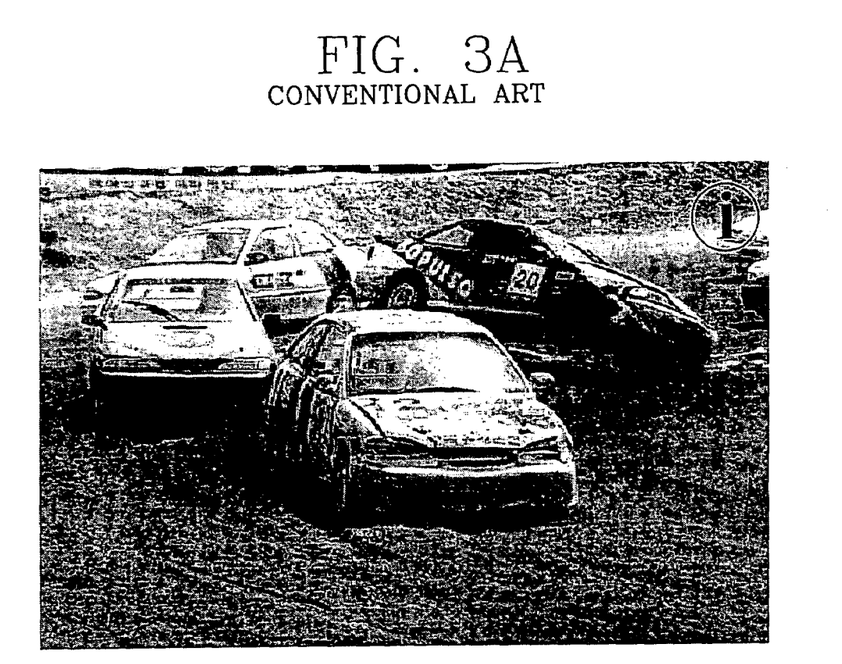
FIGS. 3A and 3B illustrate the general data information display method of the data broadcasting receiver.

FIG. 2 is a flow chart illustrating the general data information display method of the data broadcasting receiver. First, it is detected whether the data information is received among the signals tuned on the tuner 10 through the antenna (ST1). The general television picture is displayed when the data information is not detected (ST6). When the data information is detected, as depicted in FIG. 3A, the icon (for example, 'i') for indicating the presence of data information is displayed on the right upper portion of the screen 30 (ST2). At the same time, in order to output the received data information to the screen 30, the parsing, formatting, displaying are prepared (ST3). When the viewer selects the data information (ST4), in other words, when the viewer selects the "television and data information simulcast audition" icon through the remote-controller or external input device, as depicted in FIG. 3B, the data information is displayed on the screen 30 (ST5).

Meanwhile, when the viewer does not select the "television and data broadcasting simulcast audition" icon, the present audition general television picture is continually displayed (ST6).

Figure 3B:
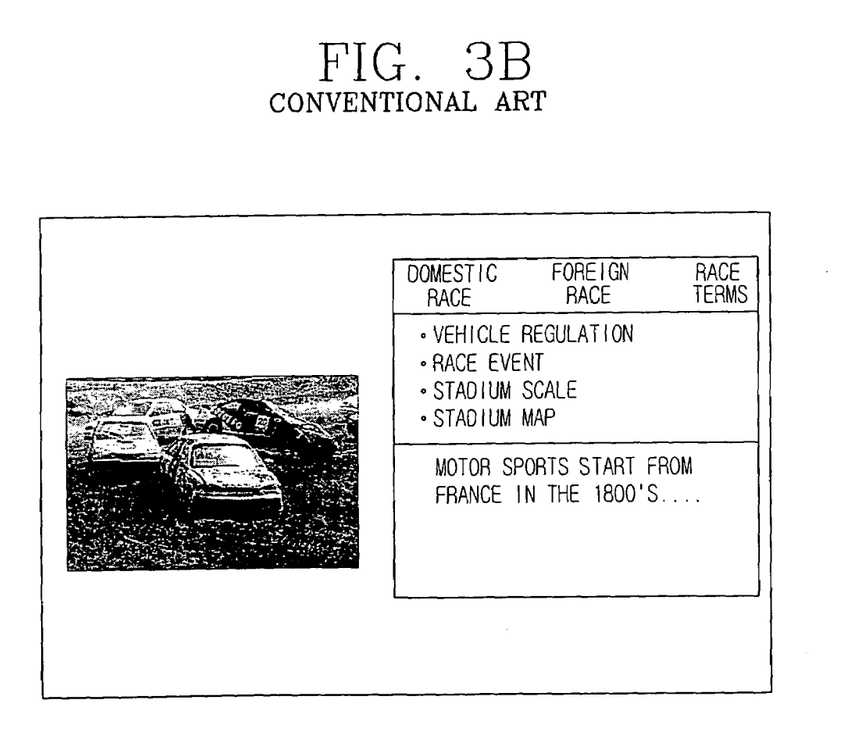

FIGS. 3A and 3B illustrate the general data information display method of the data broadcasting receiver, where the construction of the picture can be changed according to the setting of the viewer.

Generally, because the switching of the picture is differently defined according to the received data information, when the data information picture is displayed, the size of the present audition general television picture decreases or only the data information picture is displayed. But, the viewer can check the size of the data information picture only after switching into the data information picture.

In addition, when the general data information display apparatus of the data broadcasting receiver generates the icon for indicating the data information receipt, before the viewer selects the "television and data broadcasting simulcast audition" item by using the remote-controller or external input device, the viewer can not know the content of the data information received at the present.

In addition, when the viewer selects the "television and data broadcasting simulcast audition" item by using the remote-controller or external input device, the present audition television picture is switched into the television picture and data information picture, wherein an interrupt for replacing the present audition television picture occurs because the size of the present audition television picture has to be adjusted again. Accordingly, the present audition television picture can not be displayed for a certain time.

Therefore, when the present audition television picture is an important information, the viewer probably would not switch into the data information picture. Further, it is impossible to use the data information after a certain time. Accordingly the viewer can not check the data information finally.

SUMMARY OF THE INVENTION

Accordingly, an object of the present invention is to provide a data information display method of a data broadcasting receiver and an apparatus thereof which are capable of knowing the present receiving data information even when a user does not select a "television and data broadcasting simulcast audition" item by using a remote-controller or an external input device.

Another object of the present invention is to provide the data information display method of the data broadcasting receiver and apparatus thereof which are capable of watching the received data information simply while the viewer watches the present audition television picture, and storing separately the received data information in order to use later in case of need.

Another object of the present invention is to provide the data information display method of the data broadcasting receiver and apparatus thereof which are capable of helping the viewer select the picture switching by displaying the television picture size information on a simple data information picture in advance when the viewer selects to switch into the simple data information picture.

In order to achieve the above-mentioned and other objects, the data information display apparatus of the data broadcasting receiver according to an embodiment of the present invention comprises a tuner for tuning signals received through an antenna, an A/V decoder unit for converting the signal tuned on the tuner into an A/V stream, a screen for displaying the A/V stream outputted from the A/V decoder unit on a screen, a data receiving unit (listener) for searching whether there is the data information among the signals tuned on the tuner, and a PE (Presentation Engine) unit for parsing and formatting the data information detected by the data receiving unit and outputting the data information having the displayable format to the screen.

The PE unit includes a user interface for receiving an input signal of the viewer, a parsing unit for receiving the user input signal though the user interface unit and parsing the data information outputted from the data receiving unit, a summary information extracting unit as an additional module of the parsing unit for extracting the abridged data content of the data information, a formatting unit for formatting the data information outputted from the parsing unit in order to display, and a display unit for processing the data information formatted on the formatting unit so as to have the displayable format and transmitting it to the screen.

The parsing unit parses the data information outputted from the data receiving unit by using the HTML (Hyper Text Markup Language) document, CSS (Cascading Style Sheet) Paser, Java Script, etc.

In order to achieve the above-mentioned and other objects, in the simple data information display method according to the present invention, it is detected whether the data information is received. When the data information is not detected, the general television picture is displayed. When the data information is detected, an icon for informing the data information receiving is displayed on a screen.

After that, when the viewer selects the simple data information picture through the remote-controller or external input device, each HTML document among the data information outputted from the data receiving unit is parsed, the title information of each HTML document and the picture display size information are extracted, the information of each linked document is extracted by using extracted data information, and the simple data information display picture is constructed and displayed by using all the extracted information.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 4A:
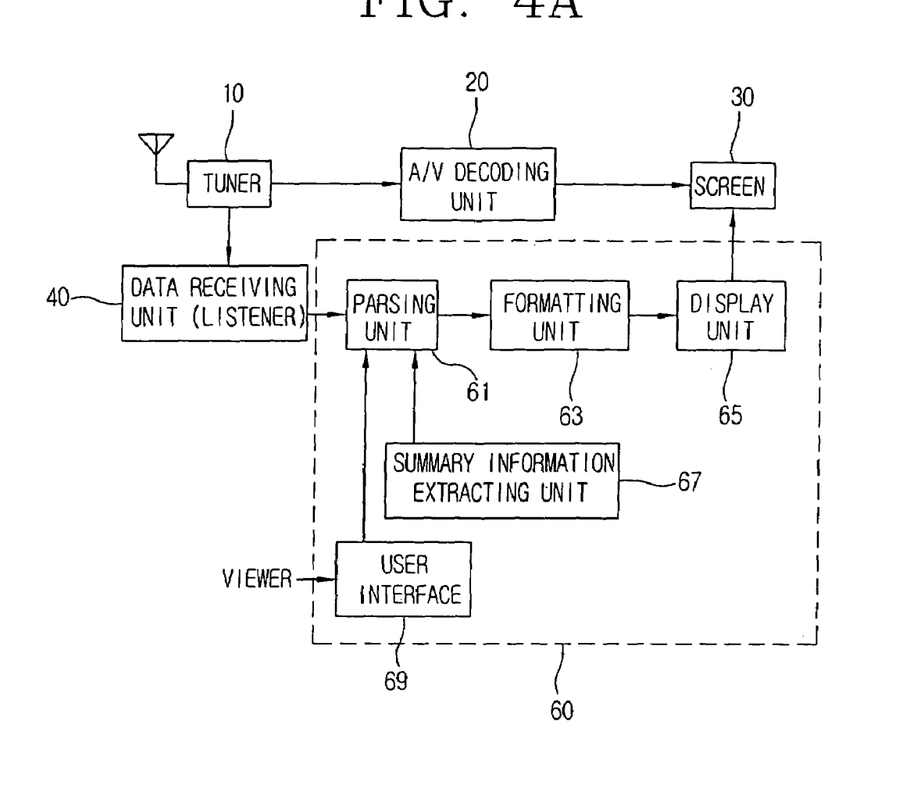
FIGS. 4A and 4B are block diagrams illustrating a data information display apparatus of a data broadcasting receiver according to the present invention.
Figure 4B:
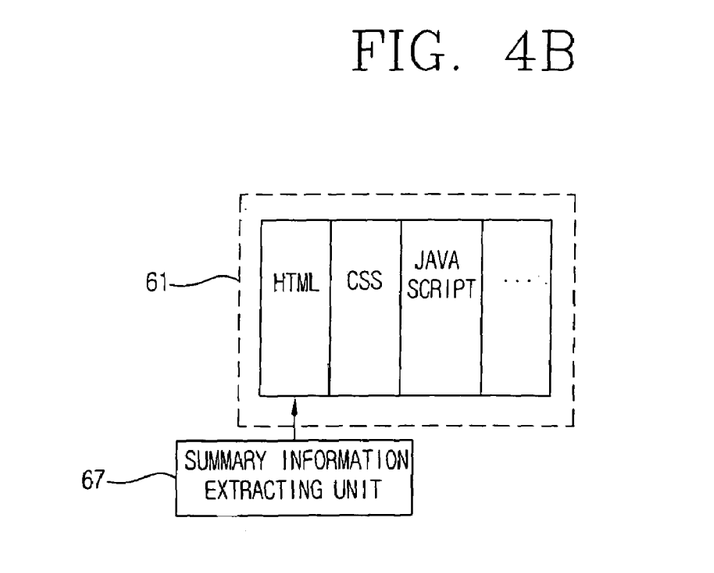

FIGS. 4A and 4B are block diagrams illustrating a data information display apparatus of a data broadcasting receiver according to an embodiment of the present invention.

As depicted in FIG. 4A, the data information display apparatus of the data broadcasting receiver according to the present invention comprises a tuner 10 for tuning signals received through an antenna, an A/V decoder unit 20 for converting the signal tuned on the tuner 10 into an A/V stream, a screen 30 for displaying the A/V stream outputted from the A/V decoder unit 20, a data receiving unit 40 (listener) for searching whether there is data information among the signals tuned on the tuner 10, and a PE (Presentation Engine) unit 60 for parsing and formatting the data information detected by the data receiving unit 40 and outputting the data information having the displayable format to the screen 30.

Herein, the PE unit 60 includes a user interface 69 for receiving an input signal of the viewer, a parsing unit 61 for receiving the user input signal though the user interface 69 and parsing the data information outputted from the data receiving unit 40, a summary information extracting unit 67 for extracting the abridged data information of the data information, a formatting unit 63 for formatting the data information outputted from the parsing unit 61 in order to display, and a display unit 65 for processing the data information formatted on the formatting unit 63 so as to have the displayable format and transmitting it to the screen 30.

Herein, as depicted in FIG. 4B, the parsing unit 61 parses the data information outputted from the data receiving unit 40 by using the HTML (hyper Text Markup Language) document, CSS (Cascading Style sheet) Paser and Java Script, etc. and is connected to the summary information extracting unit 67 for extracting the title information, display size information, and related link information by using the HTML document.

The operation of the data information display apparatus of a data broadcasting receiver having the above-mentioned construction will now be described according to an embodiment of the present invention.

First, the signal received through the antenna is tuned on the tuner 10, the tuned A/V signal is outputted to the A/V decoder unit 20, and the A/V decoder unit 20 converts the tuned signal into the A/V stream. The A/V stream is displayed on the screen 30.

Meanwhile, the data receiving unit 40 detects whether or not there is the data information among the signals tuned on the tuner 10, and stores it when the data information is detected. After that, when the viewer requests the data information output through the user interface 69 while the data receiving unit 40 receives the data information, the parsing unit 61 detects and parses the data information stored on the data receiving unit 40. The summary information extracting unit 67 connected to the parsing unit 61 extracts the abridged data information among the HTML data information parsed on the parsing unit 61. And, the formatting unit 63 formats the data information outputted from the parsing unit 61, and the display unit 65 receives the data information formatted on the formatting unit 63, processes the formatted data so as to have displayable format, and transmits it to the screen 30.

Figure 5:
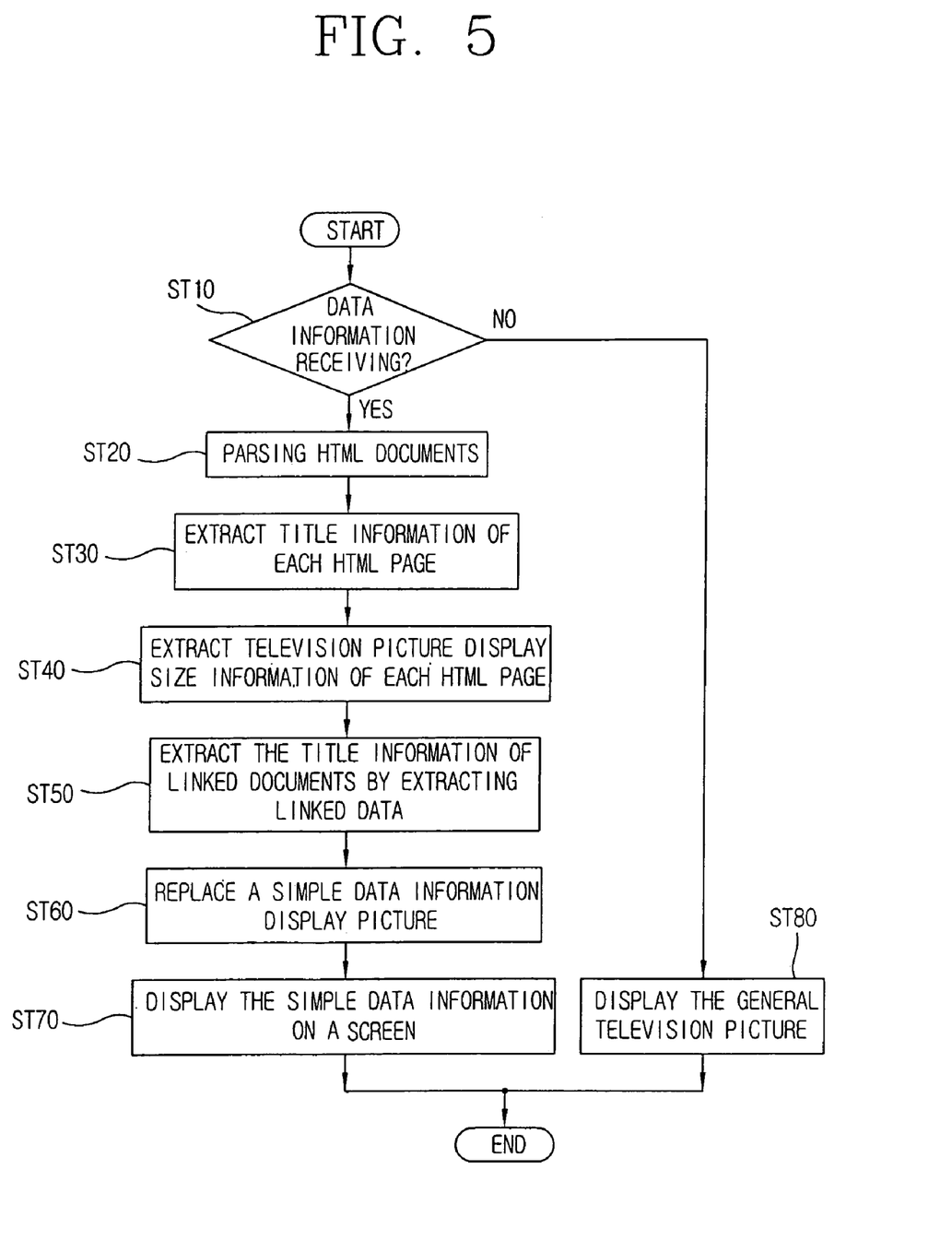
FIG. 5 is a flow chart illustrating a simple data information display method of the data broadcasting receiver according to the present invention.

FIG. 5 is a flow chart illustrating the data information display method of the data broadcasting receiver according to the present invention. First, it is detected whether the data information is received among the signals tuned on the tuner 10 through the antenna (ST10). The general television picture is displayed when the data information is not detected (ST80). When the data information is detected, an icon for indicating the data information receipt is displayed on the picture.

Figure 6A:
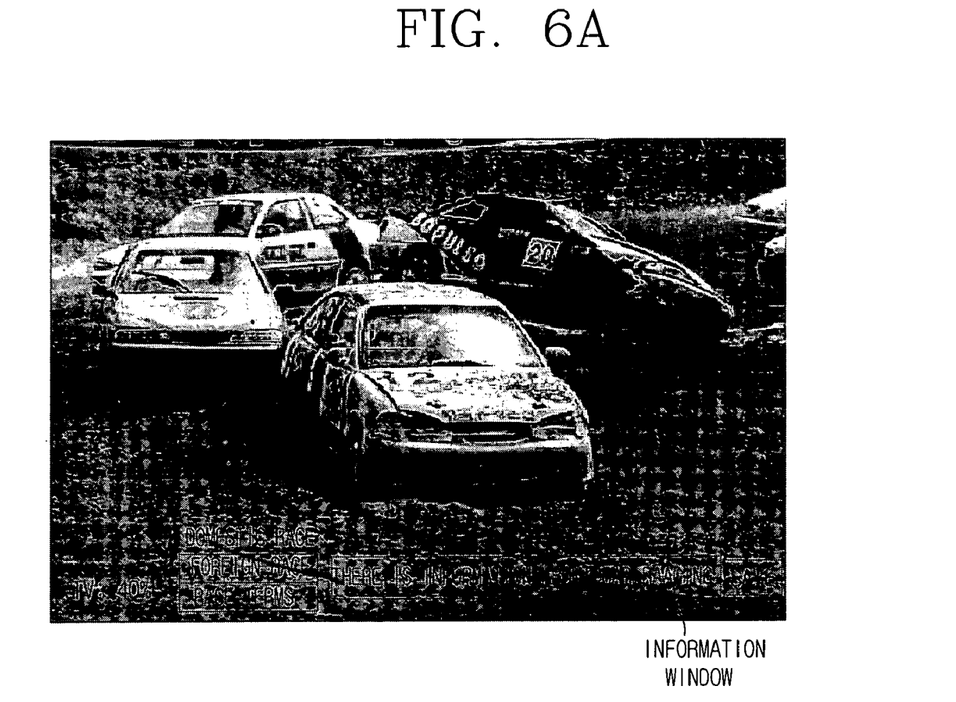
FIGS. 6A and 6B illustrate the data information display method of the data broadcasting receiver according to the embodiment of the present invention.

After that, when the viewer selects the simple data information picture through the remote-controller or external input device, the HTML document among the data information (HTML and additional title) outputted from the data receiving unit 40 is parsed (ST20). In addition, the title information (ST30) and television size information (ST40) of each parsed HTML page, and linked data, and title information of the linked document are extracted (ST50). As depicted in FIG. 6A, each link information such as a domestic race, a foreign race, race terms is constructed as a certain icon having a button shape by using all the extracted information. Each data title information corresponding to each icon is linked and the simple data information display picture is constructed (ST60), and the simple data information display picture is displayed on the screen 30 as a font having a translucent ground in order to make each button uncover the television picture (ST70).

Herein, the data of ST30 are data used on the simple data information display window, and the data of ST50 are used for making the link buttons of the simple data information picture.

Hereinafter, the operation will now be described in more detail. The HTML data of ST20 is parsed on the PE unit 60. The title information of ST30 is displayed as a tag same with the <title> inside of each HTML document. Accordingly the PE unit 60 can use the information by parsing it. In addition, the data of ST40 is defined in each HTML file. Accordingly the PE unit 60 can know the size of the television picture to be displayed. In addition, the PE unit 60 can know the link information of ST50 while parsing the HTML file. Accordingly, when the viewer selects the simple data information picture, the PE unit 60 constructs the simple data information picture and displays it.

When the viewer watches the present television picture and a data broadcasting informing icon is displayed on the screen 30, the viewer can select the "simple data information picture" or "data information picture" by using the remote-controller or other external input device. When the viewer selects the "simple data information picture", the present television picture is displayed as it is, and the font having the translucent ground for informing the title information, television display size information, and related link information is displayed on the present television picture without switching the television picture.

In addition, the information displayed on the simple data information picture is the simple information such as the title information among the data information.

When the viewer watching the simple data information picture selects the "data information picture" by using the remote-controller or external input device in order to watch the data information picture, the simple data information picture is directly switched into the data information picture.

In addition, because the simple data information picture displays the display size of the present broadcasting television picture on the data information picture, the viewer determine whether he/she wants to switch into the data information picture in view of the display size information about the present broadcasting television picture. In other words, the viewer can select the picture switching considering the display size of the present broadcasting television picture to be switched.

In addition, when the viewer does not want to switch the present audition television picture and also does not want to miss the present receiving data information, the present invention can store the present receiving data by selecting a storage button displayed on the right side of the picture. The data is stored on a built-in memory region not on a special device such as a digital VCR. It can be possible because the present receiving data is the data information not the A/V content. Accordingly, the viewer can search the stored data as occasion demands.

Figure 6B:
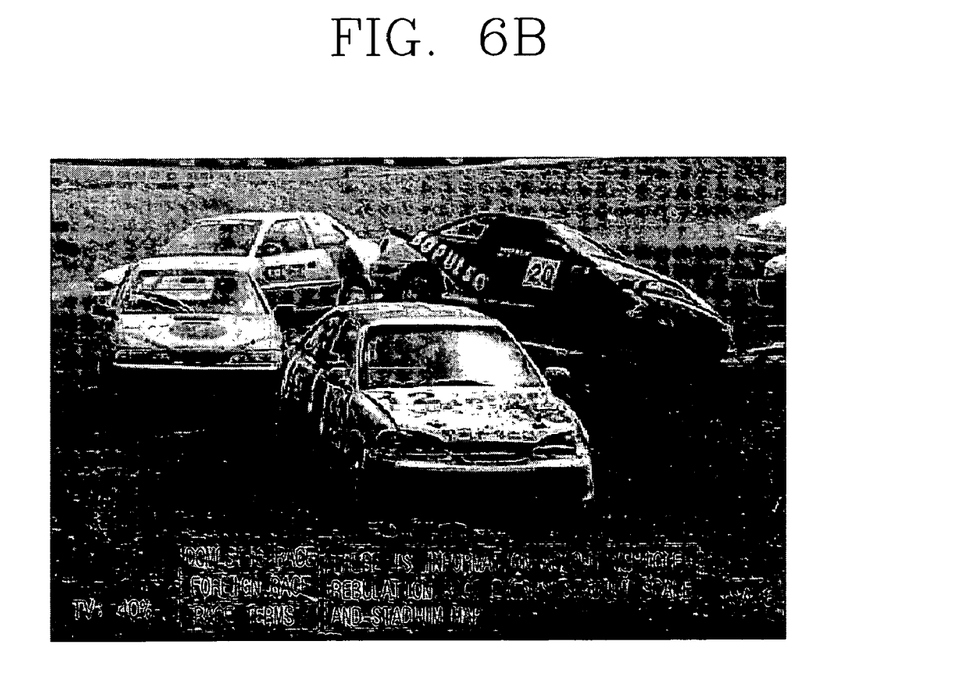

FIG. 6B illustrates an example of a picture when the viewer selects the domestic race among the linked information of FIG. 6B.

The domestic race link information informs a vehicle regulation, a race event, a stadium scale, and a stadium map information through an information window. Likewise, when the viewer selects the foreign race, race terms and the information corresponding to the foreign race are displayed on the information display window.

Therefore, the viewer can watch the simple data information picture, data information picture or general television picture according to his/her selection. When the viewer selects the simple data information picture, the viewer can generally know the present receiving data information without switching the present audition television picture.

As described above, the data information display method of the data broadcasting receiver and the apparatus thereof according to the present invention are capable of helping the viewer select the picture switching by informing in advance the present audition television picture size to be displayed with the data information picture in the data information picture switching. Accordingly the viewer can watch the present audition television picture faithfully while using the data, can separately store the data information, and can use it as occasion demands.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data information display method for a data broadcasting receiver, comprising:
    tuning signals received through an antenna and detecting whether or not data information is received among the signals tuned by a tuner;
    displaying a general television picture when the data information is not detected;
    parsing a HTML document among the data information when the data information is detected;
    providing both first and second selectors, the first selector for displaying a summary version of the HTML document of the data information, the second selector for displaying a detailed version of the HTML document;
    extracting summary information from the parsed HTML document; and
    displaying simple data information on the screen as a simple data information picture by using the extracted summary information in response to a selection of the first selector, the simple data information including size information identifying a size of a television picture to be displayed with the detailed version of the HTML document,
    wherein the simple data information picture is displayed on a present audition television picture as a font having a translucent ground in order to enable a viewer to view the present audition television picture with the simple data information picture superimposed over the audition television picture.

2. The data information display method for the data broadcasting receiver according to claim 1, wherein the summary information extracting process further comprises:
    extracting title information of each HTML page of the HTML document; and
    extracting title information of linked documents for each HTML page by extracting linked data.

3. The data information display method for the data broadcasting receiver according to claim 1, wherein the simple data information displaying step comprises:
    displaying the summary version of the HTML document at a viewer's requested time after storing the simple data information on a storing unit according to the viewer selection.

4. The data information display method for the data broadcasting receiver according to claim 2, wherein the extracting step for extracting the title information of each HTML page extracts a tag displayed as a <title> in each HTML document using a PE (presentation engine) unit.

5. The data information display method for the data broadcasting receiver according to claim 2, wherein the summary information extracting step further includes extracting the size information of the television picture to be displayed from the data information.

6. The data information display method for the data broadcasting receiver according to claim 2, wherein the extracting step for extracting the title information of the linked documents is performed while the HTML document is parsed.

7. The data information display method according to claim 1, wherein the step of displaying the simple data information includes displaying the summary version of the HTML document when the first selector is selected, and displaying the size information identifying a picture size of a general television picture to be displayed with the detailed version of the HTML document.

* * * * *